US012779586B2

(12) United States Patent
Funayama et al.

(10) Patent No.: US 12,779,586 B2
(45) Date of Patent: Nov. 3, 2026

(54) APPARATUS FOR COLLECTING DUST AND LASER PROCESSING UNIT WITH THE SAME

(71) Applicant: ORC MANUFACTURING CO., LTD., Tokyo (JP)

(72) Inventors: Masahiko Funayama, Tokyo (JP); Shuichi Shimizu, Tokyo (JP); Eiji Oohara, Tokyo (JP)

(73) Assignee: ORC MANUFACTURING CO., LTD., Tokyo (JP)

( * ) Notice: Subject to any disclaimer, the term of this patent is extended or adjusted under 35 U.S.C. 154(b) by 83 days.

(21) Appl. No.: 19/072,342

(22) Filed: Mar. 6, 2025

(65) Prior Publication Data

US 2026/0145274 A1 May 28, 2026

(30) Foreign Application Priority Data

Nov. 25, 2024 (JP) ................................ 2024-204718

(51) Int. Cl.

| | |
|---|---|
| ***B23K 26/16*** | (2006.01) |
| ***B08B 15/02*** | (2006.01) |
| ***B23K 26/066*** | (2014.01) |
| ***B23K 26/14*** | (2014.01) |
| ***B23K 26/142*** | (2014.01) |
| ***B23K 26/36*** | (2014.01) |

(52) U.S. Cl.
CPC .............. *B23K 26/16* (2013.01); *B08B 15/02* (2013.01); *B23K 26/066* (2015.10); *B23K 26/142* (2015.10); *B23K 26/1464* (2013.01); *B23K 26/36* (2013.01)

(58) Field of Classification Search
CPC .............. B23K 26/066; B23K 26/0853; B23K 26/0876; B23K 26/16; B08B 15/02
See application file for complete search history.

(56) References Cited

U.S. PATENT DOCUMENTS 6,507,000 B2 1/2003 Otsubo et al.
2008/0145567 A1 6/2008 Ohmae et al.
(Continued)

FOREIGN PATENT DOCUMENTS

CN 1939643 A * 4/2007 ............ H10P 50/242
JP 10-99978 4/1998
(Continued)

*Primary Examiner* — Atul P. Khare
(74) *Attorney, Agent, or Firm* — Greenblum & Bernstein, P.L.C.

(57) ABSTRACT

A laser-processing unit includes: a scanner configured to scan a laser beam over a mask; a projection optical system configured to project a pattern beam that passes through the mask onto a workpiece mounted on a processing stage; a gas-supply port connected with an gas-supply unit; an exhaust port connected with an exhaust unit; and a dust collector provided between the projection optical system and the processing stage. The housing of the dust collector has a first vent and a second vent. The gas-supply port and the exhaust port are inserted in the first vent and second vent, respectively. A first gap is formed between the first vent and the gas-supply port and a second gap is formed between the second vent and the exhaust port. The first and second gaps allow outside air to flow into the housing via the first vent and the second vent, respectively.

9 Claims, 4 Drawing Sheets

(56) References Cited

U.S. PATENT DOCUMENTS

| | | | |
|---|---|---|---|
| 2017/0106471 | A1 | 4/2017 | Yoshii et al. |
| 2019/0262940 | A1 | 8/2019 | Nakada et al. |
| 2021/0046584 | A1 | 2/2021 | Suwa et al. |

FOREIGN PATENT DOCUMENTS

| | | | | | |
|---|---|---|---|---|---|
| JP | 2001-321979 | | | 11/2001 | |
| JP | 2005338603 | A | * | 12/2005 | |
| JP | 2008-147242 | | | 6/2008 | |
| JP | 2016-16438 | | | 2/2016 | |
| JP | 2017-100170 | | | 6/2017 | |
| JP | 2020-157341 | | | 10/2020 | |
| KR | 20090030823 | A | * | 3/2009 | ............. B23K 26/38 |

* cited by examiner

APPARATUS FOR COLLECTING DUST AND LASER PROCESSING UNIT WITH THE SAME

BACKGROUND OF THE INVENTION

1. Field of the Invention

The present invention relates to a laser-processing unit, especially, a dust collector for removing debris that are scattered during a laser process.

2. Description of the Related Art

In a laser-processing unit or machine, a laser beam is scanned over a mask and part of the laser beam that passes through a mask pattern is irradiated onto a workpiece such as a substrate. Thus, a process such as a cutting operation is carried out using a laser beam with high energy density that melts or evaporates the surface of the workpiece. The laser beam emits enough energy to explosively remove atoms or molecules from the surface and form a processed pattern on the workpiece.

Evaporated or otherwise removed waste material from a workpiece gets scattered around the workpiece as "debris". To remove the debris, a dust collector is provided in the laser processing unit. Suwa (US2021/0046584A1) et al. discloses a laser-processing unit with a dust collector. The dust collector is provided below a projection optical system and debris produced during laser ablation are exhausted or absorbed via an outlet.

SUMMARY OF THE INVENTION

A laser-processing unit according to the present invention includes: a scanner configured to scan a laser beam over a mask; a projection optical system configured to project a pattern beam through the mask onto a workpiece mounted on a processing stage; a gas-supply port connected with a gas-supply unit; an exhaust port connected with an exhaust unit; and a dust collector provided between the projection optical system and the processing stage. The housing of the dust collector has a first vent and a second vent. The gas-supply port and the exhaust port are inserted in the first vent and second vent, respectively. A first gap is formed between the first vent and the gas-supply port and a second gap is formed between the second vent and the exhaust port. The first and second gaps allow outside air to flow into the housing via the first vent and the second vent, respectively.

A dust collector according to another aspect of the present invention includes: a gas-supply port connected with a gas-supply unit; an exhaust port connected with an exhaust unit; and a dust collector. The housing of the dust collector has a first vent and a second vent. The gas-supply port and the exhaust port are inserted in the first vent and second vent, respectively. A first gap is formed between the first vent and the gas-supply port and a second gap is formed between the second vent and the exhaust port. The first and second gaps allow outside air to flow into the housing via the first vent and the second vent, respectively.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiment of the present invention is described with references to the attached drawings.

Figure 1:
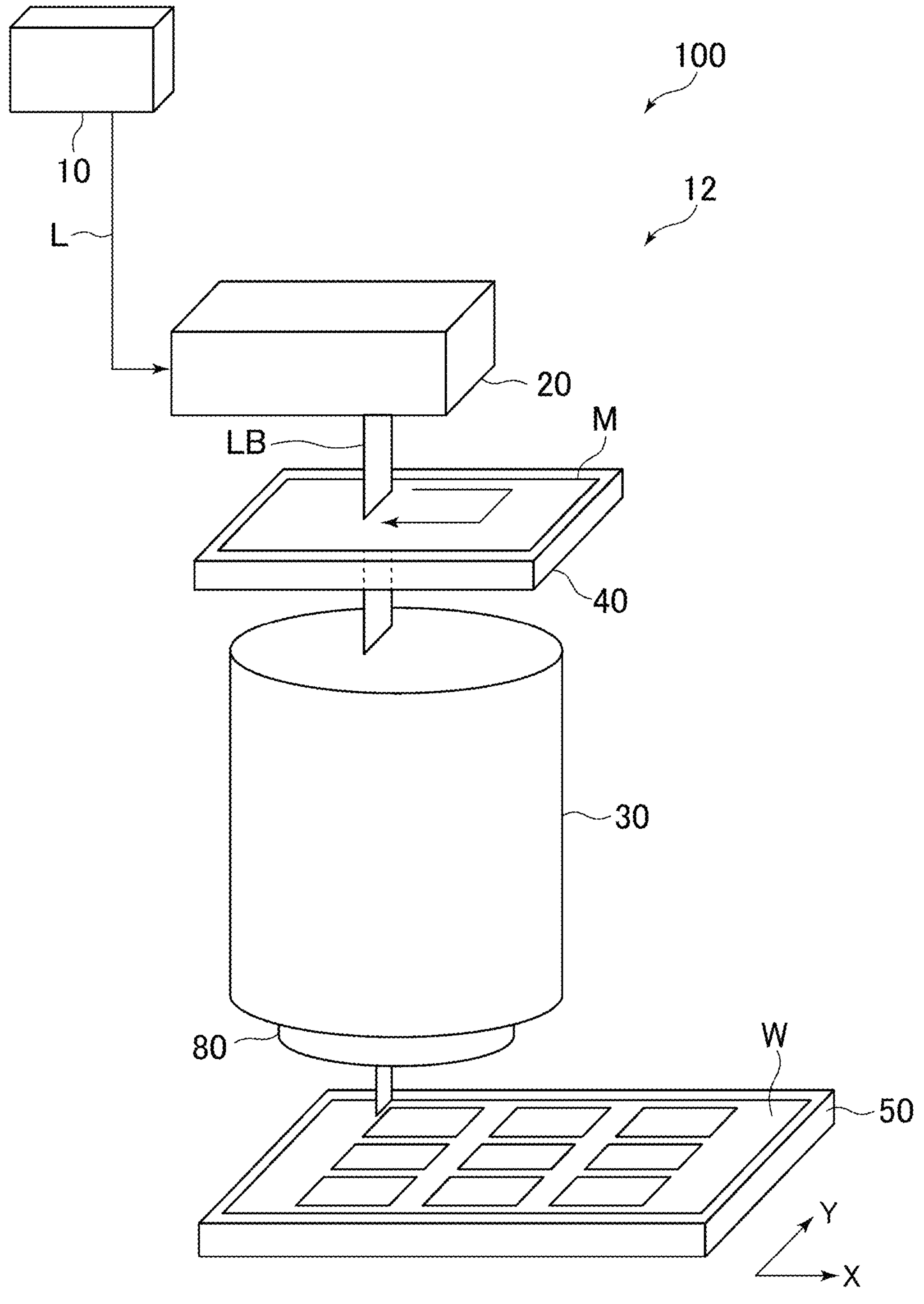
FIG. 1 is a schematic view showing a laser-processing unit according to one embodiment.

FIG. 1 is a schematic plan view showing a laser-processing unit according to the present embodiment.

A laser-processing unit 100 forms a pattern on a substrate W by laser ablation and is equipped with a light source 10 and a body 12. The light source 10 is a stand-alone type of light source, i.e., the light source 10 is mounted on the floor separately from the body 12.

The light source 10 oscillates a laser beam with high energy density. Herein, the light source 10 is an excimer laser that emits a KrF excimer laser beam in a pulse with a wavelength of 248 nm. A laser beam oscillated from the light source 10 is directed toward the body 12 via a laser delivery system (not shown).

The body 12 is equipped with an illumination optical unit 20, a scanning mechanism (not shown), a projection optical system 30, a mask stage 40 and a processing stage 50, which are supported by a supporting structure (not shown in FIG. 1) provided in the body 12. The frame-shaped supporting structure has four legs that extend toward the floor along the vertical direction and are opposite one another and evenly spaced apart. A mask M and the substrate W are mounted on the mask stage 40 and the processing stage 50, respectively.

The illumination optical unit 20 is equipped with a line-beam forming optical system (not shown) including a cylindrical lens, an angle switching mirror, etc. The line-beam forming optical system forms a line-shaped laser beam LB from the laser beam L that enters the illumination optical unit 20 along the scanning direction. The line-shaped laser beam LB is directed onto the mask M via a mirror (not shown).

The illumination optical unit 20, which is supported by the scanning mechanism, reciprocates along the scanning direction as the scanning mechanism moves along the scanning direction. Herein, the X axis and Y axis are defined along the main scanning direction and the sub-scanning direction, respectively. Also, the Z axis is defined along the vertical direction.

The scanning mechanism moves the illumination optical unit 20 along the scanning direction (the X-axis direction) at a given speed. Accordingly, the line-shaped laser beam LB perpendicular to the main scanning direction (the X-axis direction) moves relative to the mask M along the main scanning direction (the X-axis direction). Thus, the mask M mounted on the mask stage 40 and the substrate W mounted on the processing stage 50 are scanned, respectively.

The mask stage 40 supports the mask M and may move the mask M along the X-axis and Y-axis directions and rotates the mask M around the Z-axis direction to maneuver the mask M into a given position. The projection optical system 30, which has focus points on the surfaces of the mask M and the substrate W, projects a beam through the mask M onto the substrate W as a light pattern. Herein, the projection optical system 30 is a reduced-lens optical system, which has a projection magnification less than 1 (e.g., 0.25).

The processing stage 50 functions as a work chuck to fix the substrate W to the processing stage 50 by vacuum suction. Also, the processing stage 50 moves the substrate W along the X-axis and the Y-axis directions and rotates the substrate W around the Z-axis direction to position the substrate W relative to the mask M. Furthermore, the processing stage 50 may move along the X-axis direction step by step to carry out an ablation processing for the entire substrate W.

In the substrate W, a copper wiring layer is formed on an epoxy resin and an insulation layer is further formed on the copper wiring layer. As described above, the light source 10 irradiates the substrate W with the excimer laser beam with high energy density, which ablates, i.e., removes material from the substrate W so that a pattern corresponding to a mask pattern (hereinafter, "processed pattern") is formed on the substrate W.

As for the processed pattern, an interstitial via hole, blind via hole, wiring groove (trench), etc., can be formed on the substrate W. After the laser ablation process for the substrate W is finished, the substrate W is filled with a conductor such as copper.

The laser-processing unit 100 has a controller (not shown) that controls laser ablation. When an input operation for ablation processing is carried out by an operator, the controller controls the light source 10 and the scanning mechanism to scan the line-shaped laser beam LB over the mask M along the X-axis direction. Furthermore, the controller controls the movement of the mask stage 40 and the processing stage 50.

The laser-processing unit 100 is also equipped with a dust collector 80, which removes debris produced during laser ablation that are scattered around the substrate W. Hereinafter, the dust collector 80 will be explained in detail with reference to FIGS. 2 to 4.

Figure 2:
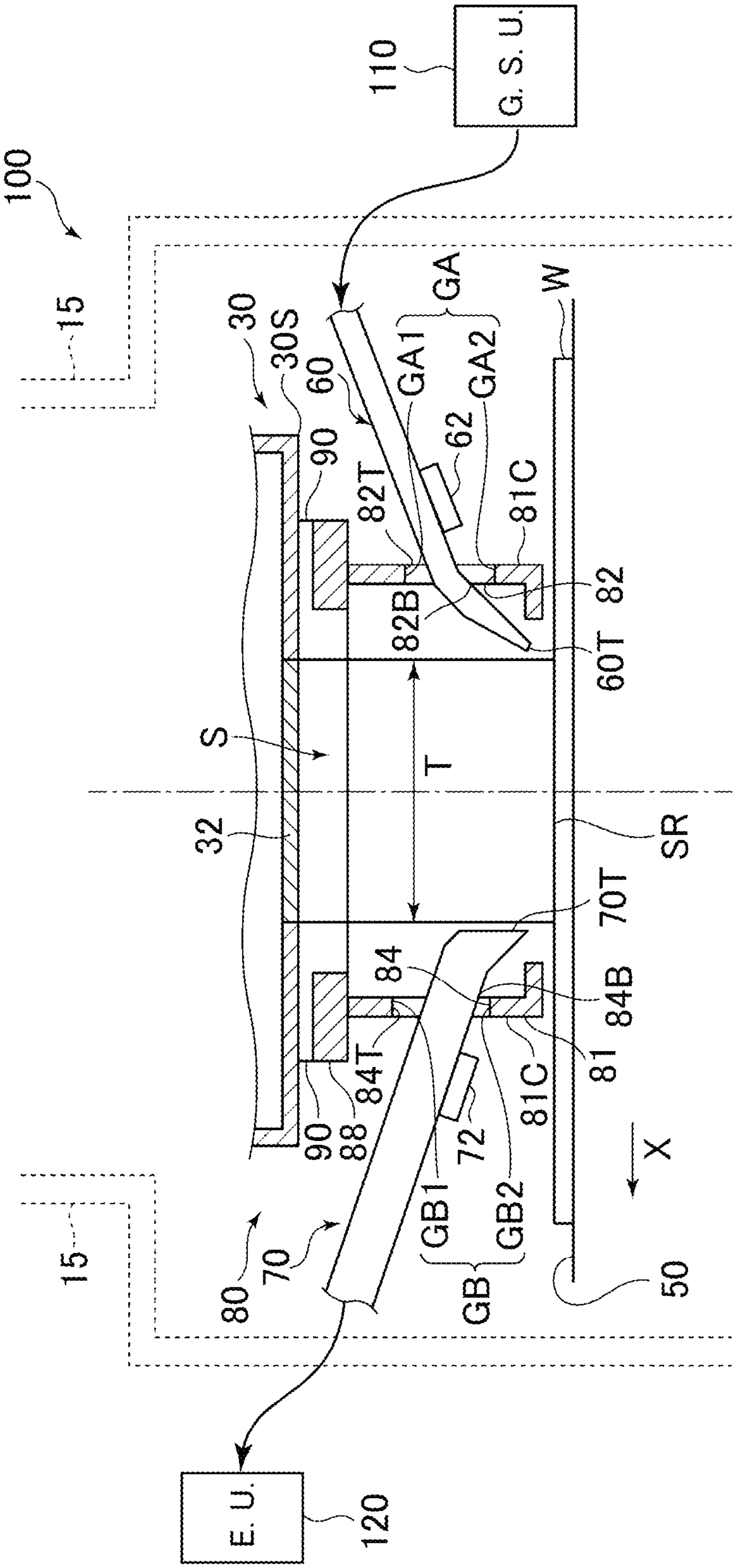
FIG. 2 is a side view of a section of a dust collector in the laser-processing unit.
Figure 3:
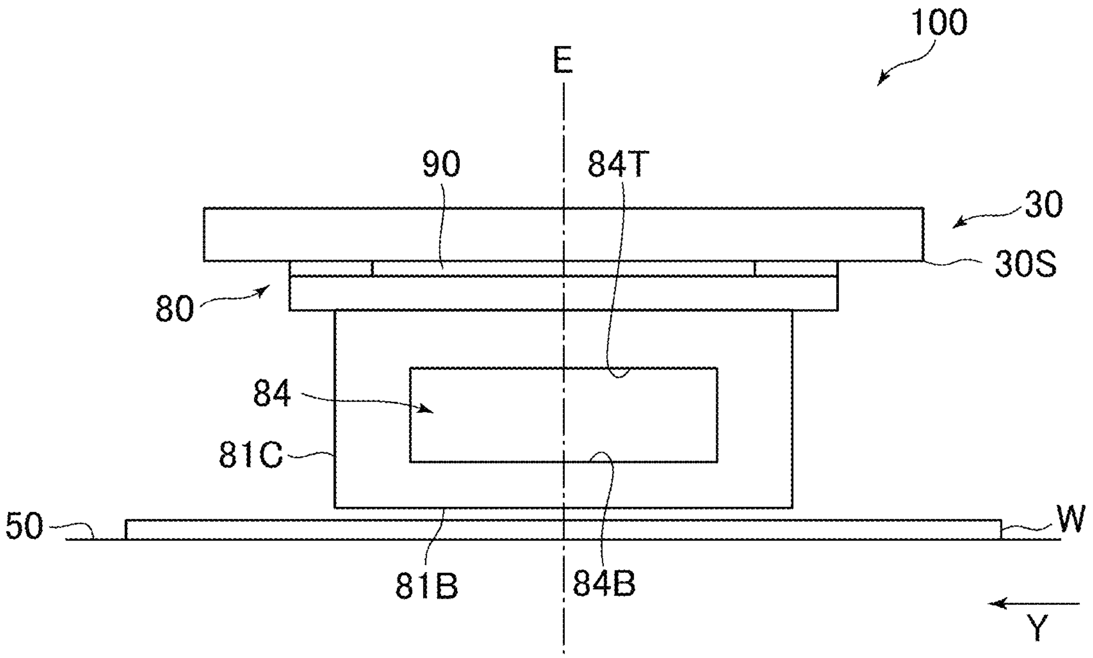
FIG. 3 is a plan view of the dust collector as seen from an exhaust duct side.

FIG. 2 is a side view of the dust collector 80 in the laser-processing unit 100. FIG. 3 is an end view of the dust collector 80 as seen from an exhaust duct side.

The dust collector 80 is equipped with a cylindrical housing 81, which is arranged between the projection optical unit 30 and the processing stage 50. A framework 88, which is provided above the housing 81, supports the housing 81 and is fixed to a lens barrel base 30S of the projection optical system 30. The bottom 81B of the housing 81 is close to the surface of the substrate mounted on the processing stage 50.

As described above, the projection optical system 30 is supported by the same supporting structure as the scanning mechanism, which supports the illumination optical unit 20, and the mask stage 40. The housing 81 is coaxial with respect to the projection optical system 30 so that the center of the housing 81 coincides with the optical axis of the projection optical system 30. In the framework 88, an outside-air inlet 90 is formed adjacent to the lens barrel 30S.

The dust collector 80 is equipped with a gas-supply nozzle (gas-supply port) 60 and an exhaust duct (exhaust port) 70. Both the gas-supply nozzle 60 and the exhaust duct 70 are tubular and have rectangular cross sections in which the longitudinal direction is horizontal. The gas-supply nozzle 60 and the exhaust duct 70 are inserted into a rectangular insertion port 82 and a rectangular insertion port 84 formed on the wall 81C of the housing 81, respectively. Hereinafter, the insertion port 82 is called a "first vent" and the insertion port 84 is called a "second vent."

The first vent 82 and the second vent 84 are formed in the wall 81C of the housing 81 to be opposite one another so that the gas-supply nozzle 60 and the exhaust duct 70 are opposite one another. In FIG. 3, the scanning direction (the X-axis direction) of the line-shaped laser beam LB is perpendicular to the plane of the paper. Note that the exhaust duct 70 is not illustrated in FIG. 3.

The gas-supply nozzle 60, which makes contact with a gas-supply unit 110, releases from its tip 60T a gas that is supplied from the gas-supply unit 110. For example, an inert gas such as helium gas or nitrogen gas may be supplied to the gas-supply nozzle 60.

The exhaust duct 70 makes contact with an exhaust unit 120, which is a negative pressure source such as an exhaust pump, and absorbs a gas from the housing 81. Herein, the gas-supply unit 110 and the exhaust unit 120 are controlled by the controller in the laser-processing unit 100 so that an amount of gas-absorption is greater than that of gas-supply during laser ablation.

The gas-supply nozzle 60 slopes downward from the position of the first vent 82 and the tip 60T of the gas-supply nozzle 60 is positioned close to the surface of the substrate W. The exhaust duct 70 also slopes downward. On the other hand, the tip 60T of the gas-supply nozzle 60 and the tip 70T of the exhaust duct 70 are positioned outside of a scanning region SR of the line-shaped laser beam LB, i.e., a processing space S of laser ablation.

The tip 60T of the gas-supply nozzle 60 is located adjacent to the bottom surface 81B of the housing 81, which is positioned close to the surface of the substrate W. The tip 70T of the exhaust duct 70 has a diameter larger than that of the tip 60T of the gas-supply nozzle 60. Furthermore, the aperture edge of the tip 70T of the exhaust duct 70 is along the up-down direction, i.e., the vertical direction. The bottom end of the tip 70T of the exhaust duct 70 is located adjacent to the bottom 81B of the housing 81, similarly to the tip 60T of the gas-supply nozzle 60.

The interval T of the scanning region SR depends upon the size or dimension of the mask M (e.g., 70 mm×70 mm). In the framework 88 of the housing 81, a cylindrical optical device 32 composed of a transparent plate glass and so on is provided in accordance to the scanning region SR.

The size of the first vent 82 corresponding to the gas-supply nozzle 60 allows a first space GA to be formed. The first space GA allows outside air to flow around the gas-supply nozzle 60 and enter the housing 81. In other words, a gap is formed between the entire outer surface of the gas-supply nozzle 60 and the first vent 82. The gas-supply nozzle 60 is not in contact with the first vent 82. The gas-supply nozzle 60 is supported and positioned by a supporting member 62 that is fixed to the supporting structure 15.

The size of the second vent 84 of the exhaust duct 70 also allows a second space GB to be formed. The second space GB allows outside air to flow around the exhaust duct 70 and enter the housing 81. A gap is formed between the entire outer surface of the exhaust duct 70 and the second vent 84. The exhaust duct 70 is supported and positioned by a supporting member 72 that is fixed to the supporting structure 15.

As described above, the gas-supply nozzle 60 and the exhaust duct 70 have rectangular cross sections and the sizes and the positions of the tips 60T and 70T are determined in accordance to the scanning region SR. The forming positions of the first vent 82 and second vent 84, which are opposite one another, are determined in accordance to the configuration and arrangement of the gas-supply nozzle 60 and the exhaust duct 70.

The size of the first vent 82 is the same as that of the second vent 84, whereas the dimensions of the gas-supply nozzle 60, i.e., the cross-sectional area of the gas-supply nozzle 60 within the first vent 82, is smaller than that of the cross-sectional area of the exhaust duct 70 within the second vent 84. Therefore, the first space GA formed around the gas-supply nozzle 60 is larger than the second space GB formed around the exhaust duct 70. Note that the size of the first vent 82 may be larger than that of the second vent 84 in a condition where the cross-sectional area of the gas-supply nozzle 60 within the first vent 82 is the same as the cross-sectional area of the exhaust duct 70 within the second vent 84.

In the second space GB, an upper portion GB1 between the exhaust duct 70 and the upper edge 84T of the second vent 84 is larger than a lower portion GB2 between the exhaust duct 70 and the lower edge 84B of the second vent 84. On the other hand, in the first space GA, a lower portion GA2 between the gas-supply nozzle 60 and the lower edge 82B of the first vent 82 is larger than an upper portion GA1 between the gas-supply nozzle 60 and the upper edge 82T of the first vent 82.

Figure 4:
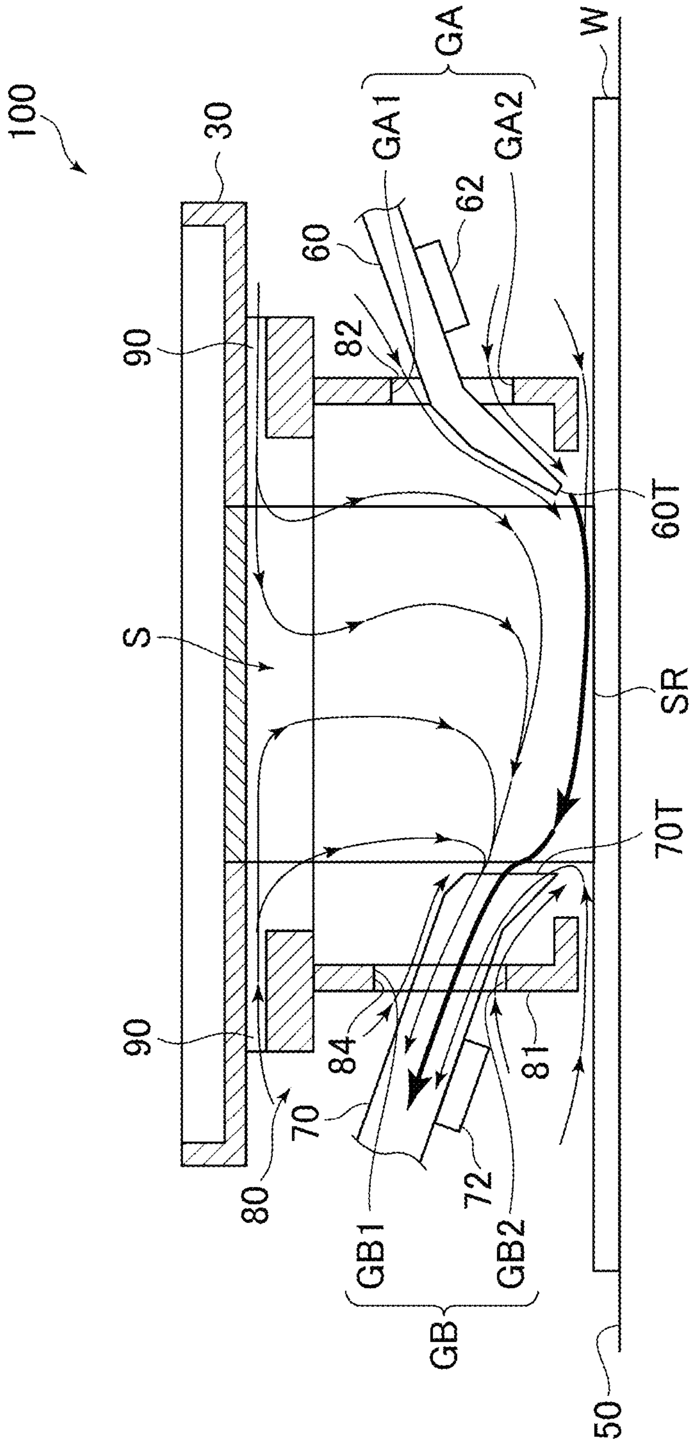
FIG. 4 is a side view showing a flow of gas in the dust collector during laser ablation.

FIG. 4 is a side view showing a flow of gas in the dust collector 80 during laser ablation.

During laser ablation, a gas is released from the gas-supply nozzle 60 toward the surface of the substrate W as the gas is supplied from the gas-supply unit 110 to the gas-supply nozzle 60. On the other hand, a gas in the housing 81 is absorbed via the exhaust duct 70 by suction of the exhaust unit 120. Consequently, an air current occurs in the housing 81. As described above, the amount of suction is greater than the amount of gas supplied during laser ablation.

The gas released from the gas-supply nozzle 60 flows along the surface of the substrate W toward the exhaust duct 60. Thus, debris produced by laser ablation get picked up by the air current and sucked out via the exhaust duct 70. In the processing space S of the housing 81, outside air flows into the housing 81 via the outside-air vent 90 so that a flow of gas descends from the framework 88 toward the substrate W.

Furthermore, outside air flows into the housing 81 via the first and second vents 82 and 84. Outside air that passes around the gas-supply nozzle 60 and flows into the housing 81 via the first vent 82 is merged with the gas released from the gas-supply nozzle 60 that flows toward the exhaust duct 70. Similarly, outside air passes around the exhaust duct 70 and flows into the housing 81 via the second vent 84.

When a vortex and/or turbulence occurs in the housing 81, it causes an accumulation of debris in the housing 81 that collects on the wall 81C of the housing 81, the surface of the substrate W, a lens of the projection optical system, etc. This debris reduces processing accuracy. However, the debris can be effectively removed since there is a stable flow of gas in the housing 81 to suppress the vortex and/or turbulence.

Since the first space GA formed between the gas-supply nozzle 60 and the first vent 82 is larger than the second space GB formed between the exhaust duct 70 and the second vent 84, a relatively large amount of outside air flows into the housing 81, which causes a stable flow of gas toward the exhaust duct 70. Especially, since the lower portion GA2 is relatively larger than the upper portion GA1, a continuous stream of outside air flows along the surface of the substrate W.

On the other hand, the second space GB formed between the exhaust duct 70 and the second vent 84 is smaller than the space GA formed between the gas-supply nozzle 60 and the first vent 82. Therefore, when outside air passes around the exhaust duct 70 into the processing-space S in the housing 81 via the second vent 84, a lot of outside air does not forcefully flow into the housing 81. Thus, an occurrence of a vortex or turbulence around the tip 70T of the exhaust duct 70 is suppressed.

Especially, in the second vent 84, the upper portion GB2 is larger than the lower portion GB1. Thus, outside air that flows into the housing 81 via the outside-air vent 90 and descends toward the substrate W is directly absorbed into the exhaust duct 70 and any occurrence of a convection current at the tip 70T of the exhaust duct 70 is suppressed.

The size or cross-sectional area of the tip 70T of the exhaust duct 70 is relatively large compared to the tip 60T of the gas-supply nozzle 60, which enables debris to be sucked out. Furthermore, the edge of the tip 70T is along the vertical direction and away from the scanning region SR. Thus, debris that collects on the surface of the substrate W is absorbed effectively.

During the operation of the exhaust unit 120, vibrations are transmitted from the exhaust unit 120 to the exhaust duct 70. However, since the exhaust duct 70 is not fixed to the housing 81 or in contact with the wall 81C of the housing 81, the vibrations are not transmitted to the housing 81 or the projection optical system 30, which prevents a decrease in processing accuracy.

In this way, the laser-processing unit 100 according to the present embodiment is equipped with the dust collector 80 between the projection optical system 30 and the substrate W (processing stage 50). The dust collector 80 has the housing 81, the first vent 82 and the second vent 84, which are opposite one another and formed in the housing 81. The gas-supply nozzle 60 is inserted into the first vent 82 and the exhaust duct 70 is inserted into the second vent 84. Then, the first space GA that allows outside air to flow into the housing 81 is formed between the gas-supply nozzle 60 and the first vent 82, while the second space GB that allows outside air to flow into the housing 81 is formed between the exhaust duct 70 and the second vent 84.

The configurations or sizes of the first vent 82 and the second vent 84 may be arbitrary as long as the first vent 82 and the second vent 84 are formed in the wall 81C of the housing 81. The shape or structure of the gas-supply nozzle 60 and the exhaust duct 70 may be arbitrary.

The first space GA and the second space GB herein may represent an intentional gap that is provided or designed in the wall 81C of the housing 81. These gaps cause a flow of gas in the housing 81, e.g., as shown in FIG. 4.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2024-204718 (filed on Nov. 25, 2024), which is expressly incorporated herein by reference, in its entirety.

The invention claimed is:

1. A laser-processing unit, comprising:

a scanner configured to scan a laser beam over a mask to form a pattern beam that passes through said mask;

a projection optical system configured to project said pattern beam onto a workpiece mounted on a processing stage;

a gas-supply port connected with a gas-supply unit;

an exhaust port connected with an exhaust unit; and a dust collector provided between said projection optical system and said processing stage, a housing of said dust collector having a first vent and a second vent, said gas-supply port and said exhaust port being inserted in said first vent and second vent, respectively, a first gap being formed between said first vent and said gas-supply port, a second gap being formed between said second vent and said exhaust port, the first and second gaps allowing outside air to flow into said housing around said gas-supply port and said exhaust port via said first vent and said second vent, respectively.

2. The laser-processing unit according to claim 1, wherein the first gap is larger than the second gap.

3. The laser-processing unit according to claim 1, wherein said second vent is rectangular, with an upper opening formed between said exhaust port and an upper edge of said second vent being larger than a lower opening formed between said exhaust port and a lower edge of said second vent.

4. The laser-processing unit according to claim 1, further comprising a supporting structure configured to support said projection optical system, said gas-supply port and said exhaust port being supported by a supporting member that is supported by said supporting structure.

5. The laser-processing unit according to claim 1, wherein said gas-supply port has a nozzle form, the tip of said nozzle being arranged adjacent to a boundary of a scanning region of the pattern beam.

6. The laser-processing unit according to claim 1, wherein said exhaust port has a duct form, the tip of said exhaust port being aligned in a vertical direction and arranged adjacent to a boundary of a scanning region of the pattern beam.

7. The laser-processing unit according to claim 1, wherein an amount of suction of said exhaust unit is greater than an amount of gas supplied by said gas-supply unit.

8. The laser-processing unit according to claim 1, wherein an outside-air vent for introducing outside air into said housing is provided between said projection optical system and said housing.

9. A dust collector in a laser-processing unit, the dust collector comprising:

a gas-supply port connected with a gas-supply unit;

an exhaust port connected with an exhaust unit; and a dust collector, a housing of said dust collector having a first vent and a second vent, said gas-supply port and said exhaust port being inserted in said first vent and second vent, respectively, a first gap being formed between said first vent and said gas-supply port, a second gap being formed between said second vent and said exhaust port, the first and second gaps allowing outside air to flow into said housing around said gas-supply port and said exhaust port via said first vent and said second vent, respectively.

* * * * *